DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 7, 1974

922 O.G. 9

T922,004

ORIFICE STRUCTURE IN APPARATUS FOR EXTRUDING MOLTEN METALS

Jerome J. English, Cary, and Nicholas K. Harakas and Bernhard T. Junker, Raleigh, N.C., assignors to Monsanto Company, St. Louis, Mo.

Filed Nov. 1, 1973, Ser. No. 412,370
**Int. Cl. B22d *11/00***
U.S. Cl. 164—82
1 Sheet Drawing. 10 Pages Specification

An improved orifice structure is provided in an apparatus for extruding fine diameter wire. In the prior practice, repeated orifice failure in such apparatus had been experienced when extruding steel containing melts, such as alloys of steel and aluminum, which must be processed at temperatures in excess of 1500° C. The cause of such failure was largely due to an insufficient high tem-

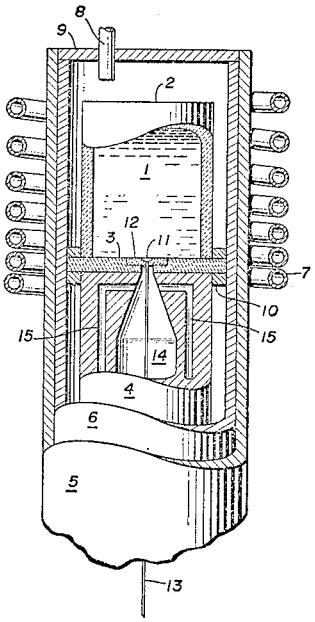

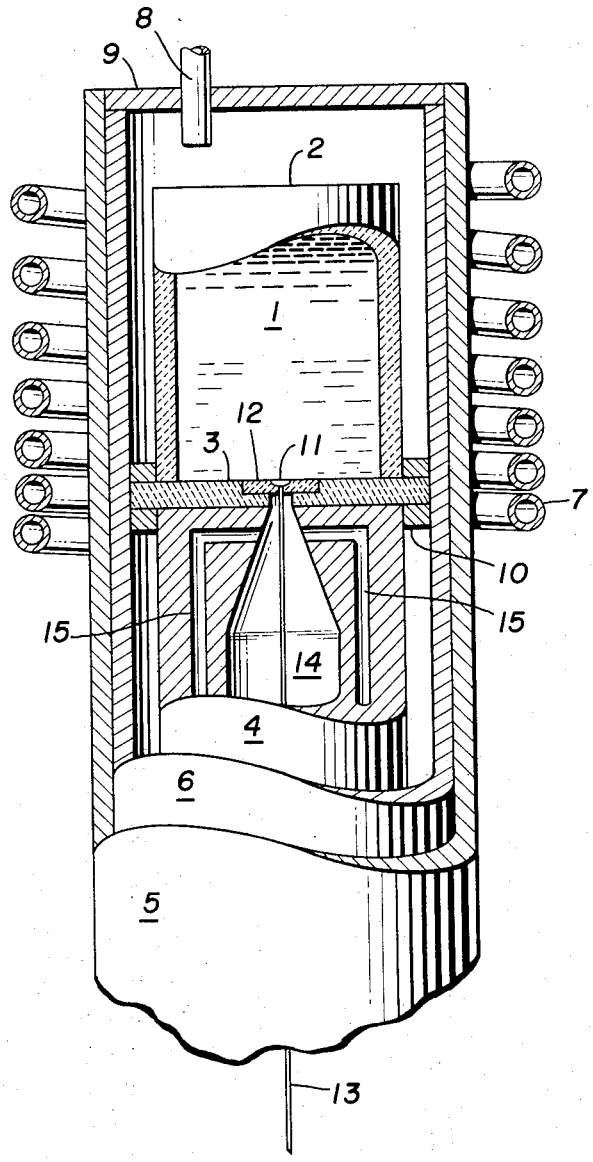

perature strength of the ceramic material from which the orifice structure was constituted. It has now been found that this problem is overcome when the orifice defining element consists of a hot-pressed beryllium oxide ceramic having a density of from 2.9 gm./cm.$^3$ to 3.0 gm./cm.$^3$ ORIFICE STRUCTURE IN APPARATUS FOR EXTRUDING MOLTEN METALS
Filed Nov. 1, 1973